United States Patent
Zheng et al.

(10) Patent No.: US 11,083,974 B2
(45) Date of Patent: *Aug. 10, 2021

(54) SYSTEM AND METHOD TO REBOIL A PROCESS STREAM IN A DISTILLATION SYSTEM BY MIXING THE STREAM WITH A HEATING MEDIUM

(71) Applicant: Cameron Solutions, Inc., Houston, TX (US)

(72) Inventors: Z. Frank Zheng, Cypress, TX (US); Christopher Stephen King, Houston, TX (US); Harihara V. Nemmara, Katy, TX (US); Matthew S. Henley, Spring, TX (US)

(73) Assignee: CAMERON SOLUTIONS, INC., Houston, TX (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/413,861

(22) Filed: May 16, 2019

(65) Prior Publication Data

US 2020/0039843 A1 Feb. 6, 2020

Related U.S. Application Data

(63) Continuation of application No. 15/193,872, filed on Jun. 27, 2016, now Pat. No. 10,471,366.

(51) Int. Cl.
*B01D 1/14* (2006.01)
*C02F 1/10* (2006.01)
(Continued)

(52) U.S. Cl.
CPC ............. *B01D 1/14* (2013.01); *B01D 1/0064* (2013.01); *B01D 1/0094* (2013.01); *B01D 3/322* (2013.01);
(Continued)

(58) Field of Classification Search
None
See application file for complete search history.

(56) References Cited

U.S. PATENT DOCUMENTS

| 3,181,600 A | 5/1965 | Woodward et al. |
| 3,294,649 A | 12/1966 | Powell, Jr. |
(Continued)

FOREIGN PATENT DOCUMENTS

| DE | 2346609 A1 | 3/1975 |
| GB | 1262458 A | 2/1972 |
| WO | 2007073204 A1 | 6/2007 |

OTHER PUBLICATIONS

Notice of Allowance issued in U.S. Appl. No. 16/413,828 dated Aug. 13, 2020, 15 pages.
(Continued)

*Primary Examiner* — Derek N Mueller
(74) *Attorney, Agent, or Firm* — Helene Raybaud

(57) ABSTRACT

A system and method to reboil a process or feed water stream in a distillation system does so in a liquid pool zone of a vessel as the stream is removed from a distillation column and comes into contact with a heating medium that is immiscible with and less volatile than the process stream. To keep the pool hot, the heating medium can be recirculated through a heater of a pump-around loop or a heater can be placed in the liquid pool. As the process stream is partially vaporized, any solids present in the process stream together with the unvaporized process or feed water stream move into the heating medium. These solids and unvaporized liquids may be further removed from the heating medium in the pool or in the pump-around loop. The vaporized stream is returned to the distillation column.

20 Claims, 2 Drawing Sheets

(51) Int. Cl.
    *B01D 1/00*     (2006.01)
    *B01D 3/32*     (2006.01)
    *B01D 3/34*     (2006.01)
    *C02F 1/04*     (2006.01)

(52) U.S. Cl.
    CPC ............... *B01D 3/34* (2013.01); *C02F 1/048* (2013.01); *C02F 1/10* (2013.01)

(56) References Cited

U.S. PATENT DOCUMENTS

| | | | |
|---|---|---|---|
| 3,875,019 A | 4/1975 | Cocuzza et al. | |
| 8,652,304 B2 | 2/2014 | Nazzer | |
| 10,471,366 B2 * | 11/2019 | Zheng | ................ B01D 1/0094 |

OTHER PUBLICATIONS

U.K. Patent 1262458 to Gilbert and GE, Water and Process Technology, 2012, pp. 1-7. (Year: 2012).
Office Action issued in the CN application 2017800440910, dated Oct. 10, 2020 (21 pages).
GE, Water and Process Technology, 2012 (retrieved Mar. 30, 2018).
Detlef Gille, Seawater intakes for desalination plants, 2003, Desalination, vol. 156, pp. 249-256.
Gamble G et al., Optimizing heat transfer fluid performance, 2014, Eastman Chemical Company, p. 8 (year: 2014).
International Search Report and Written Opinion issued in the PCT Application PCT/US2017/039490, dated Sep. 11, 2017 (14 pages).
International Preliminary Report on Patentability issued in the PCT Application PCT/US2017/039490, dated Jan. 1, 2019 (8 pages).
Office Action issued in the EP Application 17748962.2, dated Nov. 25, 2019 (6 pages).
Search report and Written Opinion issued in the SG application 11201811598Y, dated Mar. 13, 2020 (8 pages).

* cited by examiner

SYSTEM AND METHOD TO REBOIL A PROCESS STREAM IN A DISTILLATION SYSTEM BY MIXING THE STREAM WITH A HEATING MEDIUM

RELATED APPLICATIONS

The present application claims priority from U.S. application Ser. No. 15/193,872, filed Jun. 27, 2016, the disclosure of which is hereby incorporated by reference herein in its entirety.

BACKGROUND

This disclosure is in the field of reboiling a process fluid such as, but not limited to, those used in a distillation process.

The reboilers like those used in distillation process are heat exchangers to partially vaporize a process stream. There are different types of heat exchangers used as reboilers and multiple configurations of how the reboilers are connected with the distillation columns. Nevertheless, these reboilers run into scaling problems when the process fluid has the tendency to form scale due to its physical and chemical nature. Scaling is forming solids from a solution. Scaling in a reboiler is forming solids from the process fluid during partial vaporization.

U.S. Pat. No. 8,652,304 B2 ("Nazzer") discloses a method of extracting dissolved or undissolved solids from a mixture of water and a process liquid or stream. This method lets the process fluid vaporize by directly contacting the heat transfer fluid, therefore eliminating the contact of process fluid on the heat exchanger which leads to scaling. In Nazzer's patent, the mixture is introduced into a mixing zone within or upstream of a separation vessel where it is further mixed with a recycle fluid extracted from a liquid pool zone of the separator vessel and pumped through a heat exchanger.

Vaporization occurs in this mixing zone (where more than 99% of the volatile components of the feed stream are vaporized). The resulting stream is then transferred to the separator vessel in which the vapor is separated, with the solid and liquid components falling into the liquid pool zone of the separator vessel. A portion of these solids and liquids that bond to these solids then passes through a stripping zone of the separator vessel. Water residing within the stripping zone displaces the liquids bound to the solids and an aqueous waste stream with dissolved or nondissolved solids results.

Because this method requires a mixing zone for vaporization outside of the liquid pool, the required equipment is difficult to design and prone to scaling and plugging. The method also does not allow for vaporization within the liquid pool and requires the heating medium—i.e., the recycle fluid, lighter than the water in the stripping zone—to be recycled at a rate of at least ten times that of the process feed rate. This high recycle rate is required because the method must limit the temperature difference between the recycle fluid and the process stream in order to avoid thermal degradation effects.

Last, the method requires a stripping zone for solids removal. A stripping zone is prone to corrosion because of unvaporized (solids) components from the process stream. The stripping zone also presents safety concerns due to the risk of higher temperature oil contacting water. To reduce the safety concern, the oil must be cooled before it touches the water in the stripping zone, but cooling the oil increases its viscosity and ineffective solids separation results. The stripping zone does not allow for partial vaporization in situations like a reboiler due to the mixing of the unvaporized process fluid with the water in the stripping zone.

SUMMARY

The present disclosure simplifies the system and method of reboiling a process stream in a distillation system when the process fluid is prone to forming scale.

Vaporization in a mixing zone outside of the liquid pool does not occur in embodiments of the system and method, nor do the system and method have a stripping zone for solids removal. The system and method is not limited to a light heating medium relative to the process stream. Any pre-mixing of the process stream and heating medium may be done at a level below that required for partial vaporization of the process or feed water stream. Pre-mixing may also be done to provide a relatively small amount of vaporization to enhance the pre-mixing and accelerate the fluid when it enters the liquid pool.

Embodiments of the system and method may disperse the process stream into a liquid pool containing a hot heating medium that is less volatile than, and immiscible with, the process stream. To keep the pool hot, the heating medium can be recirculated through a heater in a pump-around loop. Alternatively or additionally, a heater can be placed in the liquid pool.

The vaporized portion of the process stream becomes the vapor outlet stream of the reboiling operation. The unvaporized portion of the process stream becomes the liquid outlet stream of the reboiling operation.

If there are dissolved or undissolved solids in the process stream, as the process stream is partially vaporized, the dissolved or undissolved solids come out of the stream together with the unvaporized process stream and move into the heating medium. The solids and unvaporized process stream that move into the heating medium may be further removed from the heating medium within the vessel or in a separator located in the pump-around loop. The vessel includes internals of a kind known in the art to the separate the unvaporized portion of the process or feed water stream from the heating medium. The separator can be a hydrocyclone, centrifuge, particulate filter, settling tank, or some other piece of separation device equivalent to these.

The system and method can be used in distillation systems in which the process stream is prone to scaling such as but not limited to those associated with MEG reclamation. Unlike prior art systems and methods, there is no pretreatment of the process or feed water stream or low temperature differentials between the vaporization temperature of the stream and heating medium (e.g., limited to 10° C. above the vaporization temperature due to the risk of scaling in the heat exchanger in the pump-around loop).

The embodiments of this disclosure may create a robust system for reboiling a process stream that is prone to scaling; simplify the system and method to partially vaporize a process stream so that it can be used for reboiler services; reduce the costs associated with prior art partial vaporization systems and processes so that it can be used for reboiler services; eliminate the design and operational challenges presented by mixing zones located outside of the liquid pool zone of the vessel and stripping zones for solids and unvaporized process stream removal so that it can be used for reboiler services; and eliminate the prior art's limitation of not being able to be used in partial vaporization applications in which a portion of the unvaporized process or feed water stream is in liquid form so that it can be used for reboiler services. The disclosure eliminates the need for light heating mediums relative to the process or feed water stream. The disclosure also does not require the low temperature differential between the stream and heating medium or recycle rates of at least 10 times greater than that of the process feed.

The disclosure also reduces, and potentially eliminates, pretreatment for the process stream that is prone to scaling while at the same time minimizing or eliminating scaling and fouling of equipment. Any pre-mixing of the process or feed water stream and the heating medium that occurs outside of the liquid pool zone may be done at a level below that at which the stream partially vaporizes. Pre-mixing may also be done to provide a relatively small amount of vaporization to enhance the pre-mixing and accelerate the fluid when it enters the liquid pool.

BRIEF DESCRIPTION OF THE DRAWINGS

So that the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

ELEMENTS AND NUMBERING USED IN THE DRAWINGS AND DETAILED DESCRIPTION

Figure 1:
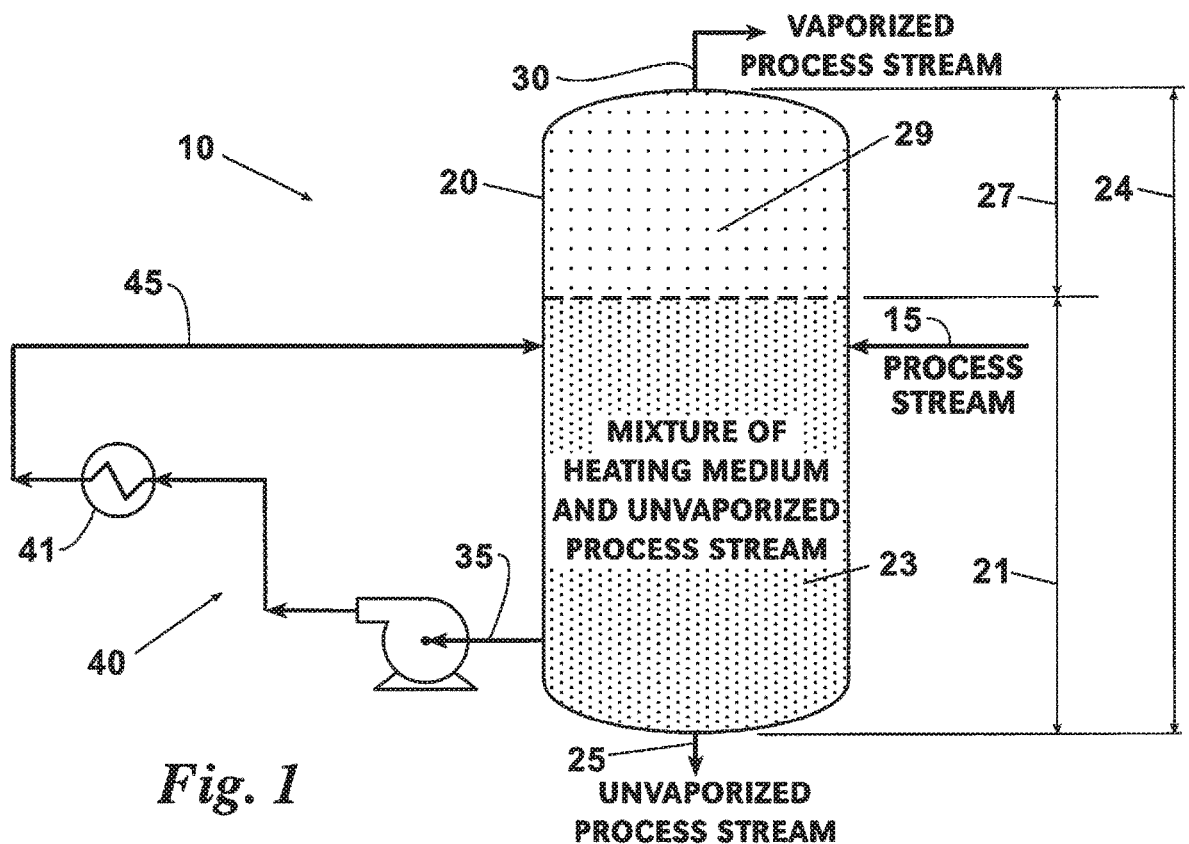
FIG. 1 is an embodiment of a system and method to reboil a process stream. A process stream having dissolved or undissolved solids is routed to a heating medium pool of a vessel. A pump-around loop recycles and heats the heating medium. If any pre-mixing of the process stream and heating medium occurs outside of the liquid pool (see FIG. 3), the pre-mixing may be at a level below that at which vaporization occurs. Pre-mixing may also be done to provide a relatively small amount of vaporization to enhance the pre-mixing and accelerate the fluid when it enters the liquid pool.

10 System or method
15 Process (or feed water) stream removed from a distillation column
17 Mixer within or outside of 20
20 Vessel
21 Liquid pool zone
23 Heating medium
24 Interior volume
25 Unvaporized (unvaporized liquids and dissolved or undissolved solids) portion of 15
27 Vapor separation zone
29 Vaporized components of 15
30 Vaporized process stream 35 Removed heating medium stream or mixture (heating medium 23 and portion of 25)
40 Pump-around loop
41 Heater
45 Heated recycle stream substantially unvaporized portion-free or with a reduced unvaporized portion 25
47 Separator or separation device (such as a hydrocyclone, centrifuge, particulate filter, settling tank or their equivalents)
50 Heating medium stream substantially unvaporized portion-free or with a reduced unvaporized portion 25 (relative to removed stream or mixture 35)

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect", "connection", "connected", "in connection with", and "connecting" are used to mean "in direct connect with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream", "above" and "below", and other like terms indicated relative positions above or below a given point or element and are used in this description to more clearly describe some embodiments of the disclosure.

Embodiments of a system and method to reboil a process stream achieve partial vaporization of volatile components in the liquid pool zone of the vessel when the stream contacts a heating medium residing in the liquid pool zone. The vessel is arranged to directly receive the process stream, thereby eliminating pre-treatment between it and the upstream process providing the stream. A pump-around loop heats a portion of the heating medium and recycles this heated portion back to the vessel. The heating medium—which is immiscible with the stream and can be lighter or heavier than the stream—is maintained at an operating temperature required for the desired partial vaporization (and reboiling) effects. Pre-mixing may also be done to provide a relatively small amount of vaporization to enhance the pre-mixing and accelerate the fluid when it enters the liquid pool. The vessel can also make use of blowdown to remove solids formed during the vaporization of the process stream from the liquid pool zone. Blowdown, as used here, refers to the removal of the unvaporized process stream with concentrated levels of dissolved or undissolved solids. A separate vessel located in the pump-around loop can be used for the separation of the blowdown.

Figure 2:
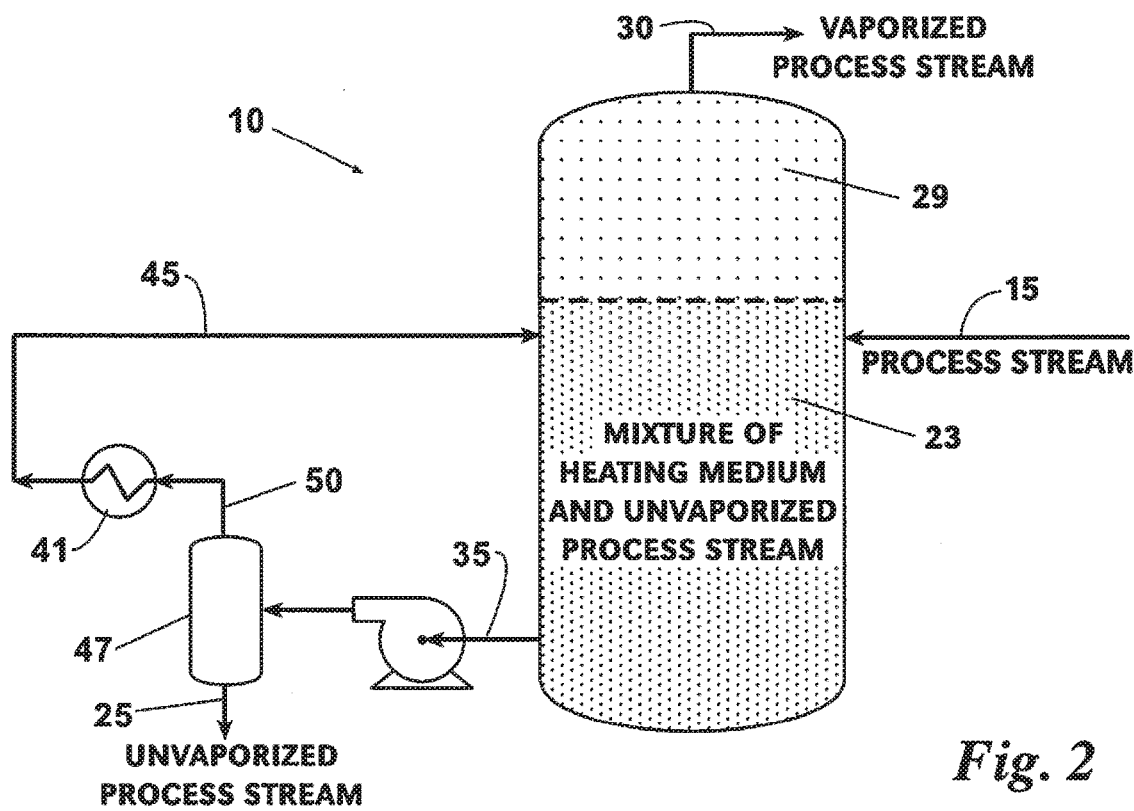
FIG. 2 is an embodiment of the system and method. The pump-around loop includes a separator for removing unvaporized portion of the process stream. The separator can be a hydrocyclone, centrifuge, particulate filter, settling tank, or some other piece of separation device equivalent to these.
Figure 3:
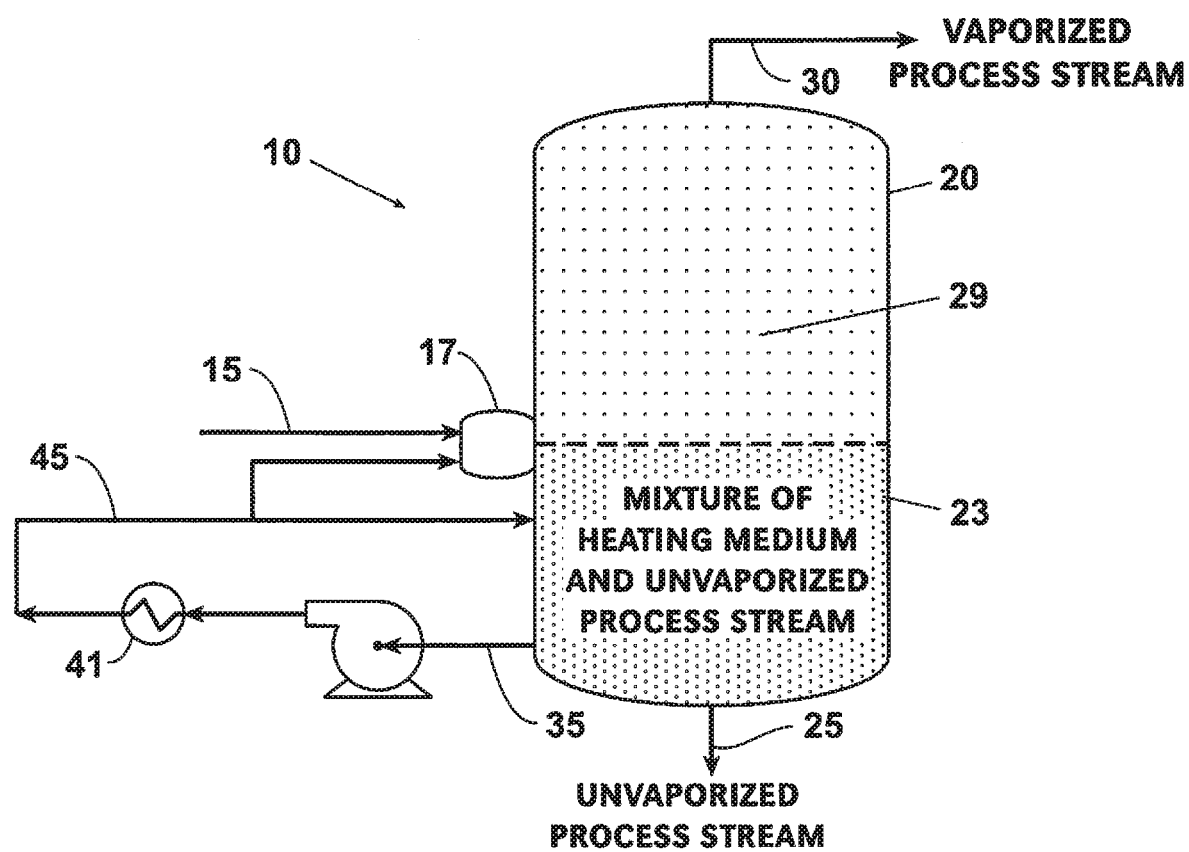
FIG. 3 is an embodiment of the system and method. Pre-mixing of the process stream and heating medium occurs outside of the liquid pool zone of the vessel but at a level below that needed for vaporization. Pre-mixing may also be done to provide a relatively small amount of vaporization to enhance the pre-mixing and accelerate the fluid when it enters the liquid pool.

The different arrangements of the system and method 10 as shown in FIGS. 1 to 3 route a process stream 15 into a vessel 20 whose interior volume 24 is defined by a liquid pool zone 21 and a vapor separation zone 27. The process stream 15 is supplied by a bottom (liquids) end of a distillation column (not shown). A heating medium 23 resides within the liquid pool zone 21 and this heating medium 23 is used to partially vaporize the volatile components 29 of the process stream 15. (Total vaporization can also be used.) Mixing of the process stream 15 and heating medium 23 occurs naturally within the liquid pool zone 21 as the process stream 15 enters the zone 21.

The now vaporized portions 29 of the process stream 15 migrate to a vapor separation zone 27 of the vessel 20 and are removed as a vaporized process stream 30. The vaporized process stream 30 is routed back to the distillation column to help drive separation in the column.

As the volatile components 29 of the process stream 15 vaporize, the unvaporized portion 25 of the process stream 15 moves into the liquid pool zone 21 along with the heating medium 23. Because the unvaporized portion 25 is immiscible with the heating medium 23, that portion can separate from the heating medium 23 in the vessel 20 or within a separator 47 located in the pump-around loop 40. The unvaporized portion 25, both liquid and undissolved solids, can be removed as blowdown stream 25.

The separator 47 used in the pump-around loop 40 can be any separator suitable, including but not limited to a hydrocyclone, centrifuge, particulate filter, settling tank, or some other piece of separation device equivalent to these or the combinations of these. A heating medium stream 50 with reduced amounts of, or without, unvaporized solids and liquids 25 exits the separator 47 and passes through the heater 41. The heated recycle stream 45 then recycles back to the liquid pool zone 21 of the vessel 20. The heated recycle stream 45 may include some portion of the unvaporized solids liquids 25 of the process stream 15.

The heating medium 23 is maintained at an operating temperature that provides the desired vaporization (and reboiler) effects. The heating medium 23 can be any heating medium depending on the make-up of process stream 15 and application-specific requirements. For example, the heating medium 23 could be one that one that is lighter than or heavier than the process stream 15. However, the heating medium 23 is immiscible with the process stream 15 to form a heterogeneous mixture with the process stream 15. The heating medium 23 is also less volatile than the volatile components 29 of the process stream 15.

To keep the heating medium 23 at the selected operating temperature, a heater (not shown) can be placed in the liquid pool zone 21. Alternatively or additionally, a removed stream 35 of the heating medium 23, which may include solids and unvaporized liquids 25 residing within the liquid pool zone 21, can be removed from the vessel 20 and routed to the pump-around loop 40 and its heater 41. A heated recycle stream 45, that may include dissolved and undissolved solids and unvaporized liquids 25, then recycles back to the liquid pool zone 21.

An embodiment of a method to reboil a process stream in a distillation system includes:
removing a process stream 15 from a distillation column;
routing the removed process stream 15 directly into the liquid pool zone 21 of the vessel 20 where it becomes mixed with a heating medium 23 that is immiscible with and less volatile than the process stream 15 and maintained at an operating temperature determined by vaporization requirements to reboil the volatile components portion 29 of the process stream 15;
removing the vaporized portion 29 of the process stream 15 from the vapor separation zone 27 of the vessel 20 as a vaporized process stream 30; and
routing the vaporized process stream back to the distillation column.

Prior to the process stream 15 entering the liquid pool zone 21 there may be no pre-treatment of the stream 15 as it exits the upstream process providing the stream 15 and there may be no mixing of the process stream 15 with the heating medium 23. Pretreatment means treatment such as but not limited to chemical dosing, filtration using selectively permeable membranes, separators, or the use of ion exchange, deaerators or blowdown prior to the process stream 15 entering vessel 20 (or some combination of the above pretreatment methods). (Coarse straining of a kind known in the art and typically done ahead of pretreatment might be used if the feed is taken directly from a natural body of water.) If any pre-mixing of the process stream 15 and heating medium 23 occurs outside of the liquid pool zone 21 (see e.g. mixer 17 in FIG. 3), the pre-mixing may be done at a level below that at which vaporization occurs. Therefore, vaporization of the process stream 15 occurs within the liquid pool zone 21 of the vessel 20.

Pre-mixing may also be done to provide a relatively small amount of vaporization to enhance the pre-mixing and accelerate the fluid 15 when it enters the liquid pool 21. The amount of vaporization that occurs may be less than that which occurs in the liquid pool 21. For example, during normal (non-turndown) operations no more than about 5% or about 20% of the volatile components in the stream 15 vaporize during pre-mixing. If the amount of vaporization does exceed that of the liquid pool, during normal operations vaporization during pre-mixing should not exceed about 80% or about 90% of the volatile components. Limiting the amount of vaporization during pre-mixing helps avoid the design challenges and scaling and plugging problems associated with the mixing zone of the prior art (see Background).

The heating medium 23 and process stream 15 form a heterogeneous mixture when residing within the liquid pool zone 21. Additionally, the density of the heating medium 23 can be greater than or less than that of the process stream 15.

The method can also include removing a portion 35 of the heating medium 23 residing in the liquid pool zone 21 of the vessel 20; raising a temperature of the removed portion or stream 35 to produce a heated recycle stream 45; and routing the heated recycle stream 45 back to the liquid pool zone 21. The removed stream 35 can also be routed to a separator 47 to produce a heating medium stream 50 substantially unvaporized portion-free or with a reduced unvaporized portion 25. Stream 50, once heated by heater 41, can be returned to the liquid pool zone 21 as the heated recycled stream 45 (also substantially unvaporized portion-free or with a reduced unvaporized portion 25).

An embodiment of a system to reboil a process stream in a distillation system includes a vessel 20 arranged to contact a process (or feed water) stream 15 exiting a bottom portion of a distillation column and route the process stream 15 into a heating medium 23 residing within the liquid pool zone 21 of the vessel 20. The interior volume 24 of the vessel 20 does not include a stripping zone for solids and liquids 25 removal. The heating medium 23 is immiscible with and less volatile than the process stream 15 and maintained at an operating temperature determined by vaporization (distillation column heating) requirements. The vaporized volatile components 29 of the process stream 15 migrate to the vapor separation zone 27 of the vessel 20.

A pump-around loop 40 is arranged to receive a portion 35 of the mixed heating medium 23 along with part or all of the unvaporized portion 25 of the process stream 15 that has moved into the heating medium 23 and then return the portion 35 back to the liquid pool zone 21 as a heated recycle stream 45. The pump-around loop 40 of the system can also include a heater 41 as well as a separator 47 arranged upstream of the heater 41 so that a substantially unvaporized portion-free or reduced unvaporized portion heating medium stream 45 is being returned to the vessel 20.

Prior to contacting the heating medium 23, the process stream 15 may not be mixed with the heating medium 23 outside of the liquid pool zone 21 of the vessel 20. If any pre-mixing of the stream 15 and heating medium 23 occurs, the mixing may be at a level below that required for vaporization of the volatile components 29. Pre-mixing may also be done to provide a relatively small amount of vaporization to enhance the pre-mixing and accelerate the fluid when it enters the liquid pool 21.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed:

1. A method comprising:
   removing a process stream from a distillation column;
   routing the process stream into a heating medium disposed in a liquid zone of a vessel, the heating medium being less volatile than the process stream, immiscible with the process stream, and maintained at a vaporization operating temperature;
   partially vaporizing volatile components of the process stream by thermal exchange with the heating medium in the liquid zone;
   removing a vaporized portion of the process stream from a vapor zone of the vessel; and
   routing the vaporized portion back to the distillation column.

2. A method according to claim 1 further comprising mixing the process stream and a portion of the heating medium before routing the process stream into the liquid zone of the vessel.

3. A method according to claim 2 wherein during mixing no vaporization of the volatile components of the process stream occurs.

4. A method according to claim 2 wherein during mixing no more than about 90% of the volatile components of the process stream vaporize.

5. A method according to claim 1 further comprising separating and removing at least some of an unvaporized portion of the process stream from the vessel directly as blowdown.

6. A method according to claim 1 further comprising:
   removing a portion of the heating medium;
   raising a temperature of the removed portion to produce a heated recycle stream; and
   routing the heated recycle stream back to the liquid zone.

7. A method according to claim 6 wherein the removed portion of the heating medium includes at least some of the unvaporized portion of the process stream.

8. A method according to claim 7 further comprising separating and removing at least some of an unvaporized portion of the process stream from the removed portion prior to raising the temperature.

9. A method according to claim 1 wherein a density of the heating medium is greater than that of the process stream.

10. A method according to claim 1 wherein the process stream includes water.

11. A method, comprising:
    removing a process stream from a distillation column;
    mixing the process stream with a heating medium disposed in a liquid zone of a vessel, the heating medium being less volatile than the process stream, immiscible with the process stream, and maintained at a reboiling operating temperature;
    partially vaporizing volatile components of the process stream by thermal exchange with the heating medium in the liquid zone;
    removing a vaporized portion of the process stream from a vapor zone of the vessel; and
    routing the vaporized portion back to the distillation column.

12. A method according to claim 11, wherein the process stream is mixed with the heating medium and the mixture is then routed into the liquid zone of the vessel.

13. A method according to claim 12, wherein during mixing no more than about 90% of the volatile components of the process stream vaporize.

14. A method according to claim 13, further comprising:
    removing a portion of the heating medium;
    raising a temperature of the removed portion to produce a heated recycle stream; and
    routing the heated recycle stream back to the liquid zone.

15. A method according to claim 14, wherein the removed portion of the heating medium includes at least some of the unvaporized portion of the process stream.

16. A method according to claim 14, further comprising separating and removing at least some of an unvaporized portion of the process stream from the removed portion prior to raising the temperature.

17. A method according to claim 11, wherein a density of the heating medium is greater than that of the process stream.

18. A method, comprising:
    removing a process stream from a distillation column;
    mixing the process stream with a heating medium disposed in a liquid zone of a vessel, the heating medium being less volatile than the process stream, immiscible with the process stream, and maintained at a reboiling operating temperature;
    heating the heating medium in a pumparound;
    partially vaporizing volatile components of the process stream by thermal exchange with the heating medium in the liquid zone;
    removing a vaporized portion of the process stream from a vapor zone of the vessel; and
    routing the vaporized portion back to the distillation column.

19. A method according to claim 18, wherein the process stream is mixed with the heating medium and the mixture is then routed into the liquid zone of the vessel.

20. A method according to claim 18 wherein during mixing no more than about 90% of the volatile components of the process stream vaporize.

* * * * *